United States Patent
Settle et al.

(10) Patent No.: US 12,055,998 B2
(45) Date of Patent: Aug. 6, 2024

(54) INTELLIGENT GROUPING OF EVENTS IN COMPUTING SYSTEM EVENT AND COMPUTING SYSTEM INCIDENT MANAGEMENT DOMAINS

(71) Applicant: INTERNATIONAL BUSINESS MACHINES CORPORATION, Armonk, NY (US)

(72) Inventors: Jonathan Ian Settle, Dursley (GB); Isabell Sippli, Metzingen (DE)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 17/654,456

(22) Filed: Mar. 11, 2022

(65) Prior Publication Data
US 2023/0289252 A1    Sep. 14, 2023

(51) Int. Cl.
*G06F 11/34*    (2006.01)
*G06F 11/07*    (2006.01)

(52) U.S. Cl.
CPC ...... *G06F 11/0787* (2013.01); *G06F 11/0709* (2013.01); *G06F 11/3447* (2013.01)

(58) Field of Classification Search
CPC ............. G06F 11/0709; G06F 11/0793; G06F 11/3466; G06F 11/07; G06F 11/3447; H04L 41/5074
See application file for complete search history.

(56) References Cited

U.S. PATENT DOCUMENTS

| | | | |
|---|---|---|---|
| 10,282,411 B2 | 5/2019 | Popescu | |
| 10,592,328 B1* | 3/2020 | Thompson | G06F 11/3072 |
| 10,685,183 B1 | 6/2020 | Arfa | |
| 10,726,208 B2 | 7/2020 | Crossley | |
| 2016/0292592 A1* | 10/2016 | Patthak | G06F 16/2228 |
| 2018/0121555 A1 | 5/2018 | Li | |
| 2018/0357299 A1* | 12/2018 | Miranda | G06F 16/2358 |

(Continued)

OTHER PUBLICATIONS

Duan, et al., "A Short Text Similarity Algorithm for Finding Similar Police 110 Incidents," 2016 7th International Conference on Cloud Computing and Big Data, 2016, IEEE Computer Society, pp. 260-264.

(Continued)

*Primary Examiner* — Yolanda L Wilson
(74) *Attorney, Agent, or Firm* — Andre Adkins

(57) ABSTRACT

A method, computer system, and a computer program for grouping a plurality of computing system fault events is provided. The present invention may include extracting a summary of computing system fault events based on at least one similarity detected. The present invention may then include generating a plurality of vectors in which each vector corresponds to a summary, clustering the plurality of vectors into a plurality of clusters based on the at least one similarity, and compressing each cluster of the plurality of clusters into at least one cluster centroid. The present invention may further include generating a group centroid for a group including the plurality of clusters based on the at least one cluster centroid. The present invention may also include presenting a correlation statement derived from a result associated with the group centroid and generating a system fault solution based on the correlation statement.

20 Claims, 8 Drawing Sheets

(56) References Cited

U.S. PATENT DOCUMENTS

| | | | |
|---|---|---|---|
| 2019/0034760 A1* | 1/2019 | Narayanaswamy Chandrasekaran | ............................ G06F 11/0709 |
| 2020/0104234 A1 | 4/2020 | Nie | |
| 2023/0100716 A1* | 3/2023 | Singh | .................. G06F 11/0709 714/48 |

OTHER PUBLICATIONS

IBM, "IBM Watson AIOps 2.0," IBM.com, [accessed Jan. 21, 2022], 3 pgs., Retrieved from the Internet: <https://www.ibm.com/support/producthub/icpdata/docs/content/SSQNUZ_current/svcaiops/aiops-prep-data-is.html>.

Intellica.Ai, "Comparison of Different Word Embeddings on Text Similarity—A Use Case in NLP," Intellica.AI, [accessed Jan. 21, 2022], 15 pgs., Retrieved from the Internet: <https://medium.com/@Intellica.AI/comparison-of-different-word-embeddings-on-text-similarity-a-use-case-in-nlp-e83e08469c1c >.

Mell et al., "The NIST Definition of Cloud Computing", National Institute of Standards and Technology, Special Publication 800-145, Sep. 2011, pp. 1-7.

Servicenow, "Create an Event Management Similarity Solution," ServiceNow, [accessed Jan. 21, 2022] , 3 pgs., Retrieved from the Internet: <https://docs.servicenow.com/bundle/paris-it-operations-management/page/product/event-management/task/create-solution-similarity.html>.

Servicenow, "Make Machine Learning Simple with Predictive Learning," ServiceNow, 2021, [accessed Jan. 21, 2022], 19 pgs., Retrieved from the Internet: <https://www.servicenow.co.jp/content/dam/servicenow-assets/public/en-us/doctype/success/playbook/machine-learning-predictive-intelligence.pdf>.

Zhou, et al., "Resolution Recommendation for Event Tickets in Service Management," IEEE Transactions on Network and Service Management, vol. 13, No. 4, Dec. 2016, pp. 954-967.

* cited by examiner

INTELLIGENT GROUPING OF EVENTS IN COMPUTING SYSTEM EVENT AND COMPUTING SYSTEM INCIDENT MANAGEMENT DOMAINS

BACKGROUND

The present invention relates generally to computing systems, and more particularly, to various embodiments for grouping of events within event and incident management domains for computing systems.

Various software platforms, such as computing system event management systems, collect data within the computing system and generate incident tickets representing event occurrences that impact the system. Solutions to these incidents may be circumstance-specific; although, certain solutions and/or components of incidents may include attributes that may be useful for providing solutions to other similar incidents. For example, in the event where an incident is reoccurring, the incident is sent to the ticketing system in which the details of the incident along with those of the solution are logged and used for assistance with subsequent incidents if subsequent incidents are applicable and grouped properly. However, it is difficult for incidents to be grouped properly due to the wide array of parameters of an event that prevent the incident from being properly identified.

SUMMARY

Additional aspects and/or advantages will be set forth in part in the description which follows and, in part, will be apparent from the description, or may be learned by practice of the invention.

According to one exemplary embodiment, a computer-implemented method for grouping a plurality of system fault events is provided. A computer receives a plurality of historical system fault data associated with the plurality of system fault events. The computer extracts a summary of each previous system fault event derived from the plurality of historical system fault event data based on at least one similarity detected. The computer generates a plurality of vectors in which each vector corresponds to a summary; clusters the plurality of vectors into a plurality of clusters based on the at least one similarity; compresses each cluster of the plurality of clusters into at least one cluster centroid; and generates a group centroid for a group including the plurality of clusters based on the at least one cluster centroid. The computer further presents a correlation statement derived from a result associated with the group centroid; and generates a system fault solution based on the correlation statement. A computer system, a computer program product, and a system for grouping a plurality of system fault events corresponding to the above method are also disclosed herein.

With this embodiment, generation of the plurality of vectors is accomplished by applying the summary of each computing system fault event to at least one word embedding model configured to generate a plurality of word vectors; wherein each word vector of the plurality of word vectors correspond to at least one event of the plurality of system fault events.

In addition, with this embodiment, compression of pluralities of clusters into at least one cluster centroid is accomplished by removing one or more duplicates of the plurality of word vectors based on the summary; and generating the at least one cluster centroid based on a cluster result of the removal, wherein the at least one cluster centroid is a representation of the applicable cluster of the plurality of clusters grouped based on the at least one similarity. The one or more duplicates are removed by removing duplicates within the plurality of clusters based on a calculated event similarity metric exceeding a threshold distance from the at least one cluster centroid In addition, with this embodiment, generation of the group centroid is accomplished by determining, via the at least one word embedding model, the group centroid based on a cluster average of a cluster of the plurality of clusters, wherein the cluster centroid is a cluster vector; and updating, via the at least one word embedding model, the group centroid based on the removal of the one or more duplicates; wherein the cluster vector corresponds to a subset of the plurality of system fault events including the at least one similarity.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
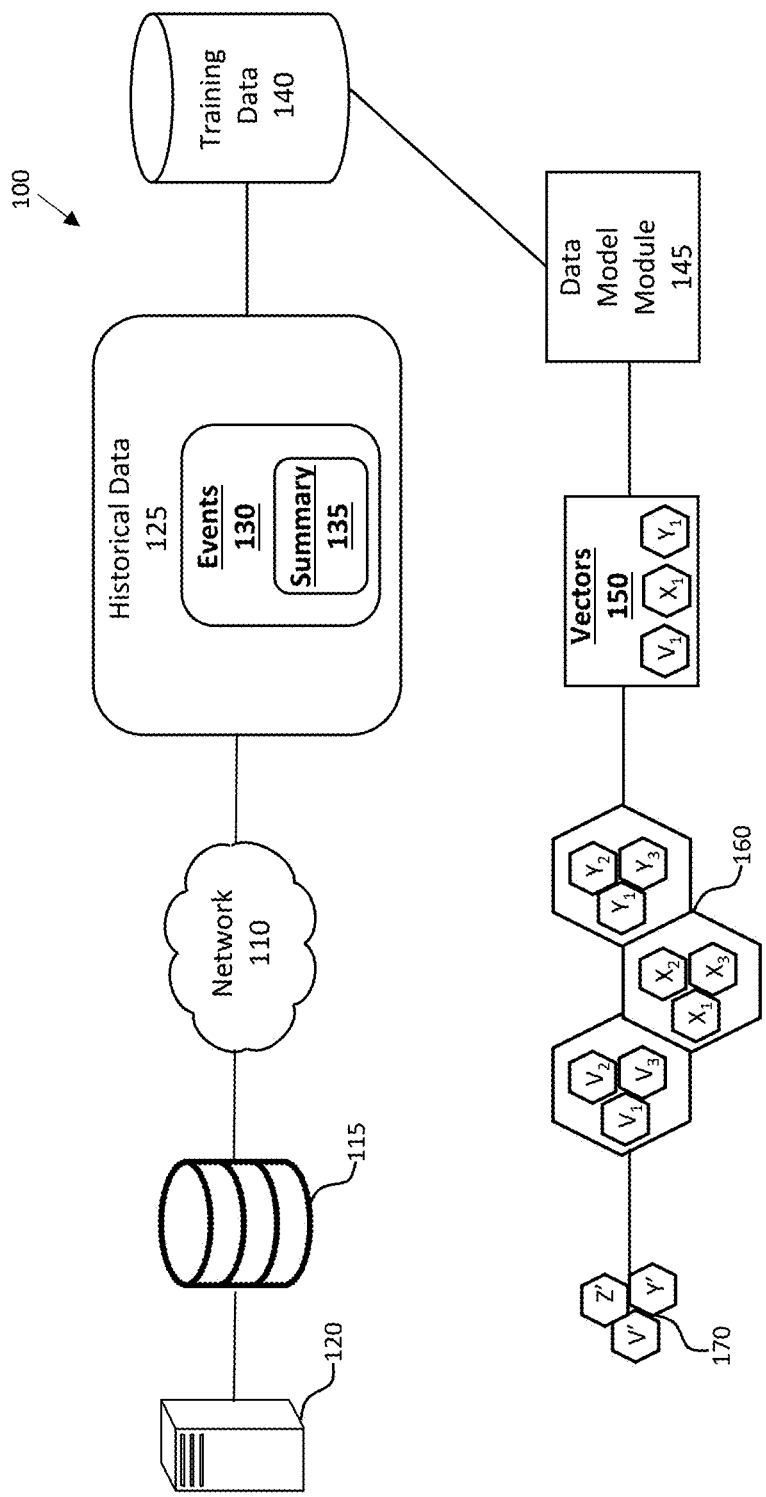
FIG. 1 illustrates a functional block diagram illustrating an event grouping environment according to at least one embodiment.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

The following described exemplary embodiments provide a method, computer system, computer program product, and system fault event grouping system within event and incident management domains. Managing and reporting events and/or incidents within a computing system results in a a large amount of data regarding problems. Resolutions frequently tend to be found in previously issued tickets. However, a common difficulty is that previously issued resolutions to problems are not applied to similar arising problems in the system because there may be a multitude of parameters associated with each problem or details of an issue are lacking to the point where proper classification of the issue is unascertainable. Therefore, it is rather difficult for the systems to properly identify, much less group problems that may require a solution similar to problems of previously issued tickets. This difficulty not only prevents efficient automation of resolving issues within a system, but also hinders notification to the proper parties equip to resolve the issue. Improvements in the detection and more importantly the grouping of computing system fault events within a computing system allows for optimized analytics such as correlation information between a new computing system fault and historical computing system faults derived from events at inference time. The correlation information serves as a foundation to the automated generation of computing system fault solutions for the issued tickets without requiring additional computing resources or user intervention to verify that system fault events are being classified correctly. As such, the present embodiments have the capacity to improve the field of computing system fault management by improving detection and classification of computing system fault events and reducing the amount of required computing resources for the aforementioned by eliminating noise (e.g., duplicate events, misclassified events, etc.) and providing automated system fault solutions.

Referring to FIG. 1, a computing system event grouping environment 100 in accordance with an exemplary embodiment is depicted. FIG. 1 provides only an illustration of implementation and does not imply any limitations regarding the environments in which different embodiments may be implemented. Modifications to computing system event grouping environment 100 may be made by those skilled in the art without departing from the scope of the invention as recited by the claims. In this exemplary embodiment, environment 100 includes a data source 115, a server 120, a training data structure 140, and a data model module 145, which are all connected via network 110. Network 110 may include various types of communication networks, such as a wide area network (WAN), local area network (LAN), a telecommunication network, a wireless network, a public switched network and/or a satellite network, etc. In some embodiments, network 110 may be embodied as a physical network and/or a virtual network. A physical network can be, for example, a physical telecommunications network connecting numerous computing nodes or systems such as computer servers and computer clients. A virtual network can, for example, combine numerous physical networks or parts thereof into a logical virtual network. In another example, numerous virtual networks can be defined over a single physical network. In some embodiments, network 110 is configured as public cloud computing environments, which can be providers known as public cloud services providers, e.g., IBM® CLOUD® cloud services, AMAZON® WEB SERVICES® (AWS®), or MICROSOFT® AZURE® cloud services. (IBM® and IBM CLOUD are registered trademarks of International Business Machines Corporation. AMAZON®, AMAZON WEB SERVICES® and AWS® are registered trademarks of Amazon.com, Inc. MICROSOFT® and AZURE® are registered trademarks of Microsoft Corporation.) Embodiments herein can be described with reference to differentiated fictitious public computing environment (cloud) providers such as ABC-CLOUD, ACME-CLOUD, MAGIC-CLOUD, and SUPER-CONTAINER-CLOUD. Server 120 may be configured to operate software and/or a platform configured to interact with a user via a mobile device, a telephone, a personal digital assistant, a netbook, a laptop computer, a tablet computer, a desktop computer, or any type of computing devices capable of running a program, accessing a network, and accessing one or more databases. It should be appreciated that FIG. 1 provides only an illustration of one implementation and does not imply any limitations with regard to the environments in which different embodiments may be implemented. Many modifications to the depicted environments may be made based on design and implementation requirements.

In some embodiments, data source 115 is a component of an event management system, ticketing system, or any other applicable software operated by server 120 configured to track, monitor, and/or resolve issues/incidents within a system known to those of ordinary skill in the art. Data source 115 may be a component of an inventory provider or a collection of resource groups, and data source 115 is designed to house a plurality of events/incidents related to an associated system in which the plurality of events (or components of said events) are configured to be transmitted to training data structure 140 over network 110. As described herein, an event is a record containing structured data summarizing key attributes of an occurrence on a managed entity, which might be a network resource, some part of that resource, or other key element associated with the applicable network, services, or applications. It should be noted that an event may or may not indicate something anomalous and may be a point-in-time, immutable statement about the entity in question; however, for the purpose of the disclosure events may also include alerts and stories representing ongoing anomalous conditions and context of issues associated with the applicable system. In some embodiments, server 120 is configured to extract, organize, filter, and aggregate data within data source 115 for insertion into training data structure 140. For example, data source 115, alone or in combination with server 120, may collect a plurality of historical data 125 associated with the applicable system in which server 120 identifies a plurality of computing system fault events 130 each event including a summary 135 reflecting event data including but not limited to the particular node the event in the system is associated with, the time of the first and last occurrence of the event, or any other ascertainable data associated with the issue and/or solution pertaining to an event. In some embodiments, server 120 extracts the textual data of summaries 135 (as discussed below) for storage within data source 115; however, data pertaining to plurality of computing system fault events 130 may be provided manually by one or more users utilizing the applicable software/platform operated by server 102 for storage within data source 115. Server 120 may access data source 115 after formatting the ascertained data for transmitting summaries 135 to training data structure 140 over network 110.

Training data structure 140 serves the purpose of housing data, such as summaries 135, for insertion into a machine-learned model operated and maintained by data model module 145. In some embodiments, data model module 145 may implement a convolutional neural network (CNN), Recurrent Neural Network (RNN), Artificial Neural Network (ANN), or any other applicable software used for building, training, and deploying machine learning models; however, data model module 145 is configured to implement Word2Vec embeddings, binary encoding, TF encoding, TF-IDF encoding, Latent Semantic Analysis Encoding, or any other applicable word embedding method or other natural language processing techniques presently existing or after arising. It should be noted that data model module 145 is configured to generate a plurality of vectors 150 in which each vector of vectors 150 represents a summary corresponding to a computing system fault event of all such events 130. In a preferred embodiment, data model module 145 utilizes FastText and/or Word2Vec to generate plurality of vectors 150 which are word vectors reflecting content of summaries 135. In some embodiments, the training process to generate plurality of vectors 150 based on plurality of historical data 125 is not necessary due to the fact that computing system fault events 130 may have previously been identified and/or grouped by users utilizing the platform operating on server 120 based on one or more similarities among two or more events of events 130. For example, the user may have encountered a "port down" error for a specific port within an applicable system in a first event which required a specific solution, and the specific solution may have been applicable to a "port down" error for another port within the applicable system in a second event. The user is able to manually group the first and second events allowing data model module 145 to generate word vectors for each event in which the word vectors of the first and second events are already grouped without the training process necessary for associating the two events. In order to ascertain an item to serve as a nexus among a cluster, the textual data of each summary of summaries 135 is embedded into a vector of vectors 150 to produce word vectors.

Data model module 145 receives the textual data and maps the textual data. Data model module 145 can include, e.g., an encoder, or other model for embedding each summary into a vector, such as, e.g., word2vec, GloVe, FastText, ELMo, or other word embedding, paragraph embedding, and sentence embedding models including topic models, skip thought models, weight sum of word functions, or any other applicable embedding. In some embodiments, the words of the textual data of summaries 135 can be mapped to vectors 150 using a plurality of markers in which each marker may correspond to a component of a summary including but not limited to type of error/issue, location of error (e.g., router port), type of solution, or any other ascertainable data derived from historical data 125, events 130, and/or summaries 135. In some embodiments, vectors 150 may include an index corresponding to each summary of summaries 135.

In some embodiments, data model module 145 is configured to capture one or more similarities between vectors 150 by clustering two or more of vectors 150 based on one or more components of summaries 135. In some embodiments, the one or more similarities may be ascertained via server 120 while server 120 is extracting summaries 135 from historical data 125; however, when the one or more similarities are ascertained via server 120 they generally are derived from data extracted from the user on the platform operated by server 120, data processed by server 120, and/or context-specific data associated with events 130 derived from historical data 125. In contrast to when the one or more similarities are ascertained via server 120, data model module 145 is configured to generate one or more event clusters 160 based on the one or more similarities wherein the one or more similarities can be determined in terms of multiple measures including but not limited to Euclidean distance, Manhattan distance, dynamic time warping (DTW) distance, Minkowski Distance, Cosine distance, Correlation coefficients (e.g. Pearson, Spearman), or any other applicable similarity measure known to those of ordinary skill in the art. The choice of similarity measure generally depends on where clustering is applied. The clustering of event clusters 160 may include one or more of K-means clustering or other centroid based clustering model, hierarchical clustering, distribution clustering models, density based clustering models such as, e.g., DBSCAN or OPTICS, HCS clustering, or neural network based models such as, e.g., self-organizing maps, or any other suitable clustering model. It should be noted that the one or more similarities may be derived from one or more components of summaries 135 in which the similarity between two or more of vectors 150 represents a shared or similar issue, solution, and/or component of the corresponding summaries 135 derived from the corresponding event. Thus, vectors including similar summary components will be clustered together resulting in each cluster of event clusters 160 having a distinct similarity.

Each cluster of event clusters 160 includes a cluster centroid generated by data model module 145 in which the cluster centroid is the representative data point for the cluster. In a preferred embodiment, modeling module 220 selects one or more components and/or factors of vectors 150, each of which may be weighted and applied to the calculation of a distance from the applicable cluster centroid. Data model module 145 is configured to compute the cluster centroid, assign aggregations of data associated with summaries 135 to the cluster centroid, and calculate the distance between the cluster centroid and the one or more components/features of event clusters 160. The calculated distance is utilized to identify clusters that correspond to each other for grouping purposes; however, additional factors may be utilized by data model module 145. For example, data model module 145 may locate vectors corresponding to relevant events that pertain to the cluster centroids via performing nearest neighbor searches on components/features within summaries 135 identified via data model module 145 traversing vectors 150. In some embodiments, the cluster centroid is a representation of the mean/average of the cluster. It should be noted that one of the primary purposes of generating a cluster centroid in environment 100 is to allow data model module 145 to utilize the cluster centroids to organize event clusters 160 into a plurality of groups 170 in which groups 170 are distinguished based upon content of summaries 135 included within vectors 150. FIG. 1 depicts vectors $V_1$, $X_1$, and $Y_1$ generated by data model module 145, each of which represents a distinct event including a distinct problem and/or solution ascertainable from summaries 135. For example, $V_1$ may pertain to "Port Down 3", $X_1$ may pertain to "Critical CPU usage on hypervisor", and $Y_1$ may pertain to "High Query timeout count". Therefore, data model module 145 clusters $V_1$ with $V_2$ and $V_3$ each of which pertaining to a port down issue and/or solution; $X_1$ with $X_2$ and $X_3$ each of which pertaining to a hypervisor issue and/or solution; and $Y_1$ with $Y_2$ and $Y_3$ each of which pertaining to a query processing issue and/or solution. Although event clusters 160 are clustered based upon similarity of underlying issue and/or solution, naturally one or more clusters would include vectors that were misclassified due to the abundance or lack of parameters ascertainable from summaries 135. Thus, data model module 145 is configured to utilize one or more extraction mechanism to circumvent clustering issues associated with duplicate computing system events and/or misclassified vectors.

Figure 2:
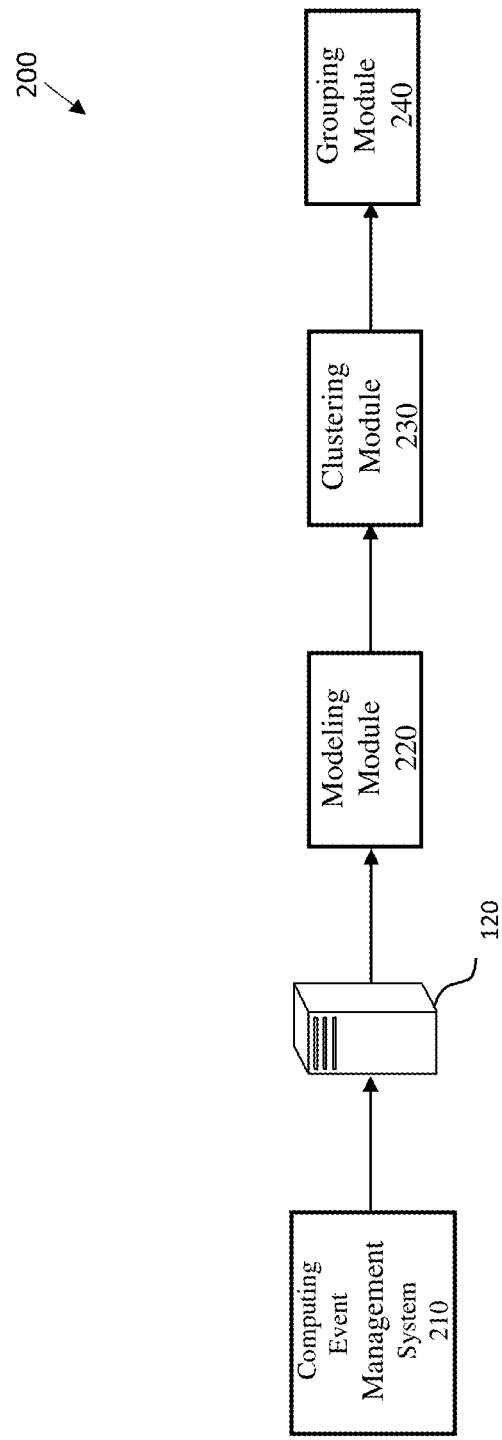
FIG. 2 is a diagram of an event grouping unit for event and incident management domains, in accordance with an embodiment of the present invention.

Referring now to FIG. 2, a data flow 200 of event grouping environment 100 is depicted in accordance with an exemplary embodiment. In a preferred embodiment, server 120 is communicatively coupled to a computing event management system 210 configured for fault management. It should be noted that although event management systems are generally configured for detecting computing system fault events (e.g. software bugs, hardware bugs, memory issues, etc.), computing system fault events 130 may also include query issues, usage issues, user-based errors, threshold triggers, or any other ascertainable analytics known to those of ordinary skill in the art. In some embodiments, data flow 200 includes a modeling module 220, a clustering module 230, and a grouping module 240 each of which are configured to communicate with server 120 and are coupled over network 110. Modeling module 220 is configured to utilize any method, such as t-Distributed Stochastic Neighbor Embedding (t-SNE), vector projection, and self-organizing map (SOM), to reduce the model's n-dimensional training data into vectors 150. In some embodiments, variance in the data of the one or more models generated via modeling module 220 is depicted as variance in the distance between vectors 150 within clusters 160 and the cluster centroid of the respective clusters. Modeling module 220 utilizes clustering module 230 to identify similarities between vectors 150 based on one or more components of summaries 135 allowing clustering module 230 to cluster vectors 150 according to the similarities. Due to the frequency and voluminosity of computing system fault events 130 occurring within computing event management system 210, duplicates of computing system fault events 130 may result and must be filtered out by clustering module 230 preventing the duplicates from being vectorized by modeling module 220. In some embodiments, clustering module 230 renders the clustering of vectors 150 via one or more compression schemes configured to compress vectors 150 into clusters 160. In some embodiments, preservation of the clustering structure rendered by clustering module 230 may be accomplished by assigning IDs to one or more components of vectors 150 for location identification purposes. It should be noted that clustering of vectors 150 is performed by clustering module 230 in an unsupervised manner allowing the clustering to be tight.

The one or more compressions schemes may move or modify data of vectors 150 in order to prevent loss of the clustering structure. The one or more compression schemes is any process that minimizes the data on the memory of the hardware performing the process. For example, the compression scheme may include a quantization, such as a MMSE (Minimum Mean Square Error) quantization of the data. In some embodiments, the compression scheme may assist with removal of duplicates of computing system fault events 130 within vectors 150 resulting in reduction of distance between vectors 150. The computation of distances between one or more of vectors 150 based on the one or more similarities results in optimized clustering of vectors 150 by clustering module 230 identifying the k closest neighbors based on the computed distances. These distances may also be used in generation of the cluster centroids in which duplicates within computing system fault events 130 are removed based on calculated distances not conforming to requirements specific to computing event management system 210. For example, the calculated distances between vectors 150 are used to remove the duplicates of vectors 150 based upon a calculated event similarity metric exceeding a threshold distance in which the threshold distance may be established by modeling module 220 and/or server 120. It should be noted that the removal of the duplicates not only assists clustering module 230 in identifying which of vectors 150 should be clustered together, but also allows clustering module 230 to continuously cluster vectors 150 into a cluster centroid which may be a vector rooted in the one or more similarities. For example, a first word vector pertaining to "Port Down Port 16", a second word vector pertaining to "Port Down Port 14", and a third word vector pertaining to "Port Down Port 3" would be deemed as duplicates of each other and at least two of the vectors are removed without requiring modeling module 220 to generate a template. Clustering module 230 creates cluster centroids in which each cluster of clusters 160 includes a cluster centroid; however, the cluster centroids allow a balance to clusters 160 in which the one or more similarities serve as the nexus of respective clusters. For example, a listing of summary events reflecting "Port Down 14"; "Port Down 15"; "Port Down 16"; "Interface Down on server A"; and "Application X no longer reachable" would ordinarily have a bias towards grouping based on Port Down. However, due to the balancing performed by clustering module 230 the bias is circumvented allowing "Port Down 25"; "Interface Down on server B"; and "Application Y no longer reachable" to be grouped together accordingly. This approach allows the similarity of a cluster to be taken into account at a cluster-level as opposed to a vector-level; thus, optimizing the ability of modeling module 220 to identify the one or more similarities and instruct grouping module 240 accordingly in future iterations.

Grouping module 240 utilizes the cluster centroids generated by clustering module 230 to generate plurality of groups 170. In particular, grouping module 240 generates a plurality of group centroids each group centroid corresponding to a group of groups 170. In some embodiments, grouping module 240 generates the group centroid based on a cluster average of the applicable cluster of clusters 160 in which the cluster centroid is the cluster vector. In some embodiments, the compression scheme preserves the centroid of each cluster and reduces the variance of each cluster. The compression scheme may also include rescaling the data of the word vectors by moving the pieces of data towards the centroid of their cluster.

Figure 3C:
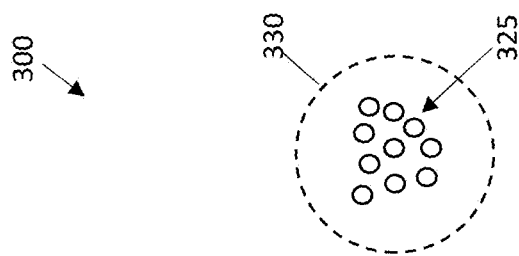
FIG. 3A-C are diagrams of a clustering and grouping of events for event and incident management domains, in accordance with an embodiment of the present invention.
Figure 3B:
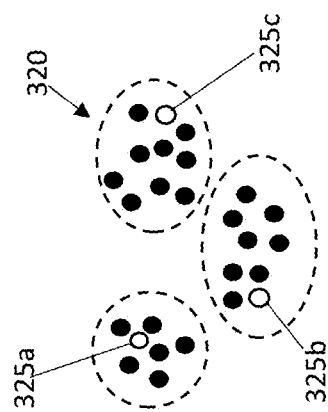
Figure 3A:
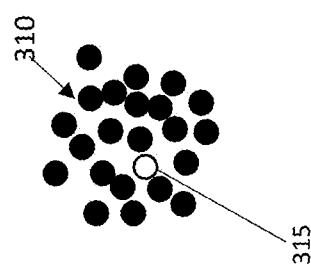

Referring now to FIG. 3A-C, a diagram 300 illustrating the stages of clustering of vectors 150 and grouping of clusters is depicted in accordance with an exemplary embodiment. It should be noted that the purpose of diagram 300 is to depict not only the mapping of one or more components of summaries 135 to word vectors via modeling module 220, but also the clustering of the word vectors into cluster centroids via clustering module 230 and the grouping of cluster centroids into group centroids via grouping module 240. In some embodiments, once data model module 145 and/or modeling module 220 maps the one or more components of summaries 135, the result is the plurality of word vectors as shown, for example, in FIG. 3A. As shown, the word vectors may be plotted as data points 310 in a vector space in which the vector space may be any applicable quantity of n dimensions corresponding to summaries 135. In some embodiments, one or more misclassification mechanisms may be utilized in order to provide indicators (e.g. arrows reflected in x & y coordinates) configured to show where one of the word vectors should be clustered and/or classified. The aforementioned mechanisms may be applied while clustering module 230 is in the process of clustering within the applicable groups. For example, grouping module 240 may be executing a density-based clustering algorithm, like DBSCAN, to not only establish groups corresponding to resulting clustering of clustering module 230, but also to exclude outliers and apply misclassification mechanisms to the outliers to indicate which cluster a misclassified word vector should be included within. Meanwhile, clustering module 230 is actively removing duplicate and/or repeating word vectors corresponding to summaries 135 resulting in the distance between the word vectors being minimized. Balancing of data points 310 may be completed upon one or more of data model module 145, modeling module 220, and clustering module 230 generating a cluster centroid 315 representing not only a word vector of a relevant issue/solution pertaining to summaries 135 but also a reference point for calculation of distance from the word vectors of a cluster. In some embodiments, cluster centroid 315 may be reassigned based upon additional data received by data model module 145 and/or modeling module 220 that allows optimization of clustering of data points 310 via clustering module 230. Additional data may include but is not limited to an issue/solution threshold, an optimized solution for a common issue of computing system fault events 130, or any other applicable ascertainable data configured to be utilized by data model module 145 and/or modeling module 220 to more efficiently classify and cluster data points 310. For example, two word vectors may include a similar solution resulting in the two word vectors being clustered together; however, the additional data received may indicate that said similar solution is obsolete and cluster centroid 315 may need to be reassigned resulting in changes to data points 310 (e.g., recalculation of distance from reassigned cluster centroid).

As previously noted, clustering module 230 may perform any clustering techniques known to those of ordinary skill in the art in order to identify event clusters 160. In some embodiments, clustering module 230 may identify word vectors that are within a threshold distance of each other, for example, as shown in FIG. 3B. FIG. 3B, is a diagram depicting a plurality of clusters 320 clustered via clustering module 230 in which each cluster of clusters 320 includes cluster centroids 325a, 325b, and 325c, respectively. It should be noted that each cluster of clusters 320 corresponds to a distinct issue/solution derived from summaries 135 and that the distance between clusters 320 may be determined based on relevance to the closest corresponding issue/solution. In some embodiments, cluster centroids 325a, 325b, and 325c along with their respective clusters are the result of removing duplicate/repeating word vectors within data points 310. For example, the cluster including cluster centroid 325a pertains to port down issues, the cluster including cluster centroid 325b pertains to CPU usage on hypervisor issues, and the cluster including cluster centroid 325c pertains to query processing issues. Thus, each of cluster centroids 325a-c are grouped into separate groups in each which each of the groups corresponds to the issue/solution that the respective cluster centroid pertains to. In a preferred embodiment, cluster centroids 325a-c are agnostic in which the cluster centroids are not platform/software specific allowing clustering module 230 to properly cluster clusters 320 irrespective of software or system that computing system fault events 130 are derived from. For example, cluster centroid 325a may be derived from a computing system fault event that occurred within computing event management system 210; however, cluster centroids 325b and 325c may be derived from systems unprecedented to server 120 or cluster centroids 325a-c may pertain to a similar issue/solution in which the issue/solution applies to distinct computing resources of various systems. Thus, modeling module 220 and/or clustering module 230 is designed and configured to utilize one or more patterns of computing system fault events 130 (e.g., each event occurrence, an event type, and one or more resources associated with the event occurrence) in order to ascertain the one or more similarities, and cluster clusters 320 accordingly. This clustering may be accomplished in a variety of manners; for example, server 120 and/or data model module 145 may calculate an event threshold score in which the clustering of clusters 320 occurs based on data derived from the word vectors exceeding the event threshold score. However, the event threshold score may be agnostic to the system and the applicable computing resource that the issue/solution pertains to. Therefore, the event threshold score may serve as a foundation of the clustering (e.g., a variable in the calculated event similarity metric) in which data model module 145 and/or modeling module 220 may utilize variances in the distance between the word vectors in each cluster from the applicable cluster centroid, and from each other. These variances may include the relevant computing resources associated with the issue/solution, the hosting platform/system, or any other applicable ascertainable distinction between events that does not drastically impact the issue/solution of computing system fault events 130.

Each of cluster centroids 325a, 325b, and 325c may be used as the basis for grouping module 240 to not only group clusters 320 into the appropriate group, but more importantly to generate a group centroid 330, for example, as shown in FIG. 3C. FIG. 3C, is a diagram depicting group centroid 330 including cluster centroids 325a, 325b, and 325c (collectively referred to as cluster centroids 325 in FIG. 3C). In some embodiments, cluster centroids 325a, 325b, and 325c may be non-agnostic; however, upon being grouped as cluster centroids 325 and included in the generation of group centroid 330, cluster centroids 325 may become agnostic allowing group centroid 330 to serve as a representative model utilized by data model module 145 configured to significantly increase the speed of correlation for data model module 145 in future iterations when dealing with an issue/solution corresponding to the group including group centroid 330. In some embodiments, group centroid 330 is calculated as the geometric centroid derived from each of cluster centroids 325 in which group centroid 330 is a vector of cluster centroids 325.

Figure 4:
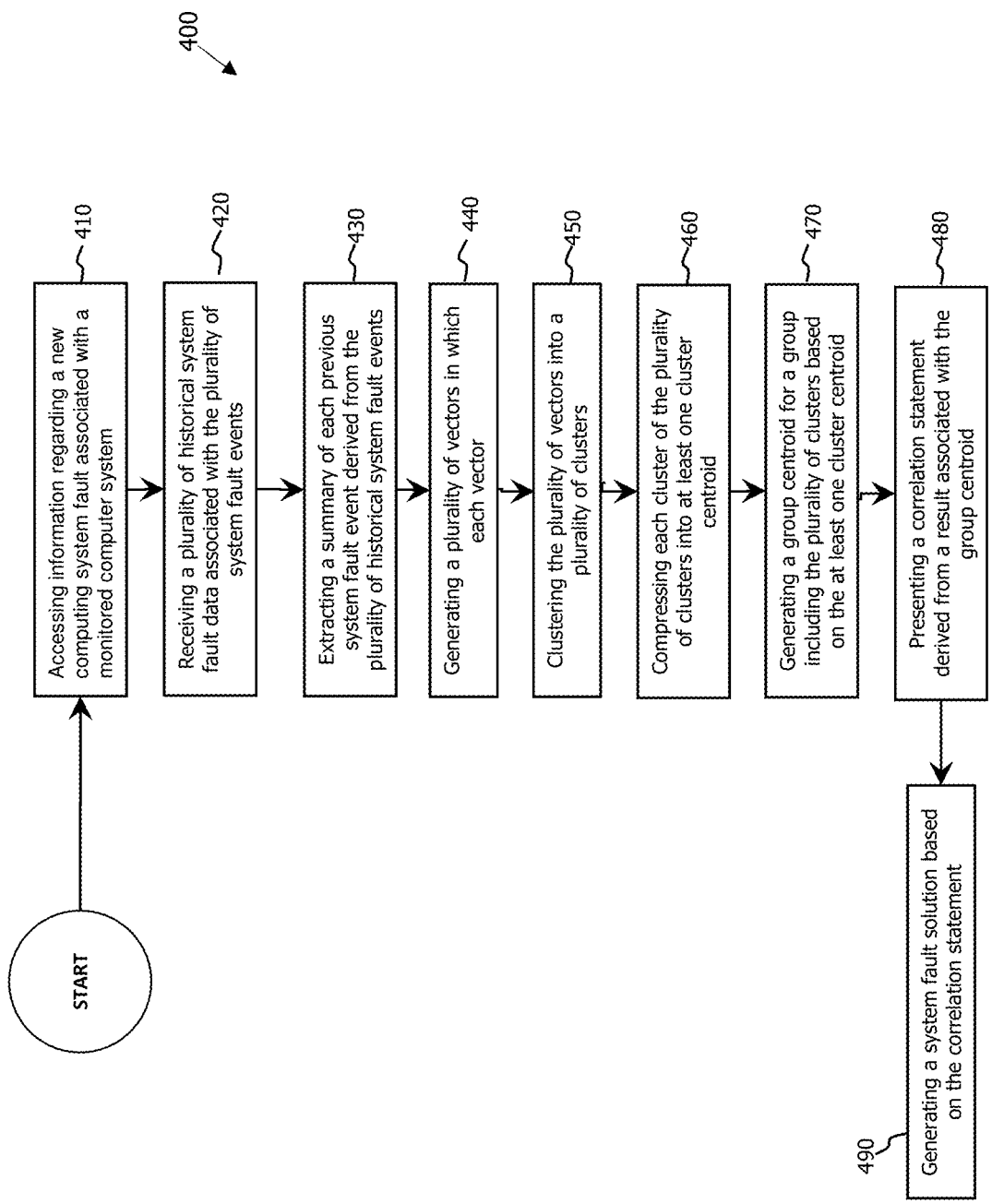
FIG. 4 illustrates a flowchart illustrating a process for grouping of events according to at least one embodiment.

Referring now to FIG. 4, an operational flowchart illustrating an exemplary process for grouping of computing system fault events 400 is depicted according to at least one embodiment.

At step 410 of process 400, server 120 accesses information of a computing system fault associated with computing event management system 210. It should be noted that said information may be received from any applicable source; however, computing event management system 210 may be associated and/or connected to other systems configured to provide information pertaining to computing system fault events. The information may be provided in any applicable format known to those of ordinary skill in the art.

At step 420 of process 400, server 120 receives a plurality of historical data 125 over network 110. In some embodiments, historical data 125 is derived from the software/platform operated by server 120; however, historical data 125 may also be derived from outputs of data model module 145 and/or modeling module 220 that are configured to be stored in data source 115. It should be noted that the outputs of data model module 145 and/or modeling module 220 may be utilized by future iterations of process 400 because the outputs may include clustering and grouping protocols that facilitate optimization of training performed by data model module 145 and/or modeling module 220. For example, an example of types of data derived from historical data 125 is depicted in Table 1 and Table 2:

TABLE 1

| Group 1: { |
|---|
| "port down 3" |
| "port down 14" |
| "port down 26" |
| "Switch off" |
| } |

TABLE 1

| Group 1: { |
|---|
| "port down 3" |
| "port down 14" |
| "port down 26" |
| "Switch off" |
| } |

Due to the weighing inherently performed by machine-learning models, it is possible for Group 1 and Group 2 to not be correlated due to one or more of the aforementioned variances in which the full extent of data within Group 1 and Group 2 is not taken into consideration. By data model module 145 and/or modeling module 220 being configured to utilize outputs from previous iterations, this issue is circumvented via the ability of data model module 145 and/or modeling module 220 to continuously factor the history of clustering and compression of word vectors performed by clustering module 230, the history of grouping of the clusters performed by grouping module 240, and the generation of centroids without having to utilize complex regular expressions or established templates.

At step 430 of process 400, server 120 extracts summaries 135 corresponding to computing system fault events 130 from historical data 125. In some embodiments, computing system fault events 130 include one or more readable columns configured to be traversed by server 120 in which the readable columns are configured to include data designed to make up one or more components of summaries 135 (e.g., applicable node, priority of the event, predicted applicable group, etc.). In some embodiments, data pertaining to summaries 135 can be manually provided the user operating on the platform provided by server 120. For example, the user may provide a name, data type, and/or description associated with an event of computing system fault events 130 if said data is not able to be ascertained via server 120. As will be appreciated from the exemplary table above, the information about computing system fault events 130 may include matches across multiple columns (i.e. in different data fields/columns). Accordingly, analysis of the information may face the problem that disparity in the monitoring system data formatting results in information about the resource(s) associated with events to be in different data fields/columns. In some embodiments, server 120 may identify the one or more patterns of computing system fault events 130 based on data included in the columns in order to ascertain data such as an event type of computing system fault events 130 and resource pairs matching a related issue/solution within a particular cluster or grouping. Server 120 may be further configured to ascertain data pertaining to relevant events associated with one or more of computing system fault events 130 which may be utilized to predict resource usage, constraints and/or impacts associated with computing system fault events 130. This feature may also apply to events that have not previously occurred.

At step 440 of process 400, data model module 145 and/or modeling module 220 generates the plurality of word vectors configured receive mapping of the one or more components of summaries 135. It should be noted that mapping of summaries 135 to the plurality of word vectors may be based on various factors including but not limited to index of the particular summary of summaries 135, content within the readable columns, or any other applicable factor pertaining to mapping data across a vector space known to those of ordinary skill in the art. In some embodiments, data model module 145 and/or modeling module 220 simultaneously maps summaries 135 to vectors 150 and locates the "n" closest centroids to either the ascertainable issue/solution of the vector or one or more components of summaries 135. In application, data model module 145 and/or modeling module 220 finds the "n" corresponding clusters of clusters 160 and renders measurements of distance for each summary of summaries 135 with the "n" corresponding clusters.

At step 450 of process 400, clustering module 230, individually or with assistance from data model module 145 and/or modeling module 220, clusters vectors 150 into event clusters 160 based on the one or more similarities. In some embodiments, each event cluster includes a cluster centroid in which the cluster centroid represents not only a word vector of the relevant issue/solution pertaining to the particular cluster derived from summaries 135, but also a reference point for calculation of distance from the word vectors of the cluster the cluster centroid is included within.

At step 460 of process 400, clustering module 230, individually or with assistance from data model module 145 and/or modeling module 220, compresses the word vectors of the particular event cluster of clusters 160 into the cluster centroid resulting in a plurality of cluster centroids in which each cluster centroid pertains to a distinct issue/solution of summaries 135.

At step 470 of process 400, grouping module 240, individually or with assistance from data model module 145 and/or modeling module 220, generates a group cluster for each group including event clusters 160 based on the plurality of cluster centroids. It should be noted that it is assumed that event clusters are progressively being grouped via grouping module 240 throughout the aforementioned steps; however, the grouping of vectors 150 may be used by correlation rules and policies may be generated from correlation rules deployed by one or more of server 120, data model module 145 and/or modeling module 220. These correlation rules may be derived from previous iterations, predictions regarding future iterations, and/or data received from the user on the platform. In some embodiments, the policies are applied in real-time to events received by server 120 in order for grouping module 240 to optimize grouping of event clusters 160. In some embodiments, the group cluster is a cluster vector configured to allow the one or more similarities of groups to be calculated via grouping module 240. The purpose of the cluster vector is to optimize the calculation of distance between the group centroids of each group; thus allowing the cluster vector to serve as a singular word embedding for the group it belongs to along with optimize the classification of word vectors in future iterations.

At step 480 of process 400, server 120 provides to the user operating on the software/platform a correlation statement derived from one or more results associated with the generated group centroids. The purpose of the correlation statement is to provide the user with visual representations along with metrics/analytics of the accuracy of the clustering and grouping of word vectors. In some embodiments, the correlation statement is a report configured to be downloaded by users in order to analyze the improvement of correlation of system failure of events compared to previous iterations or other systems.

At step 490 of process 400, server 120 generates a system fault solution based on the correlation statement. In some embodiments, the system fault solution is a resolution to one or more system fault events that have been classified, clustered, and grouped via the aforementioned steps. In some embodiments, the system fault solution is administered automatically via server 120; however, a notification may be provided to the user that the system fault solution is necessary and available resulting in the user having the discretion to instruct server 120 to execute the system fault solution.

Figure 5:
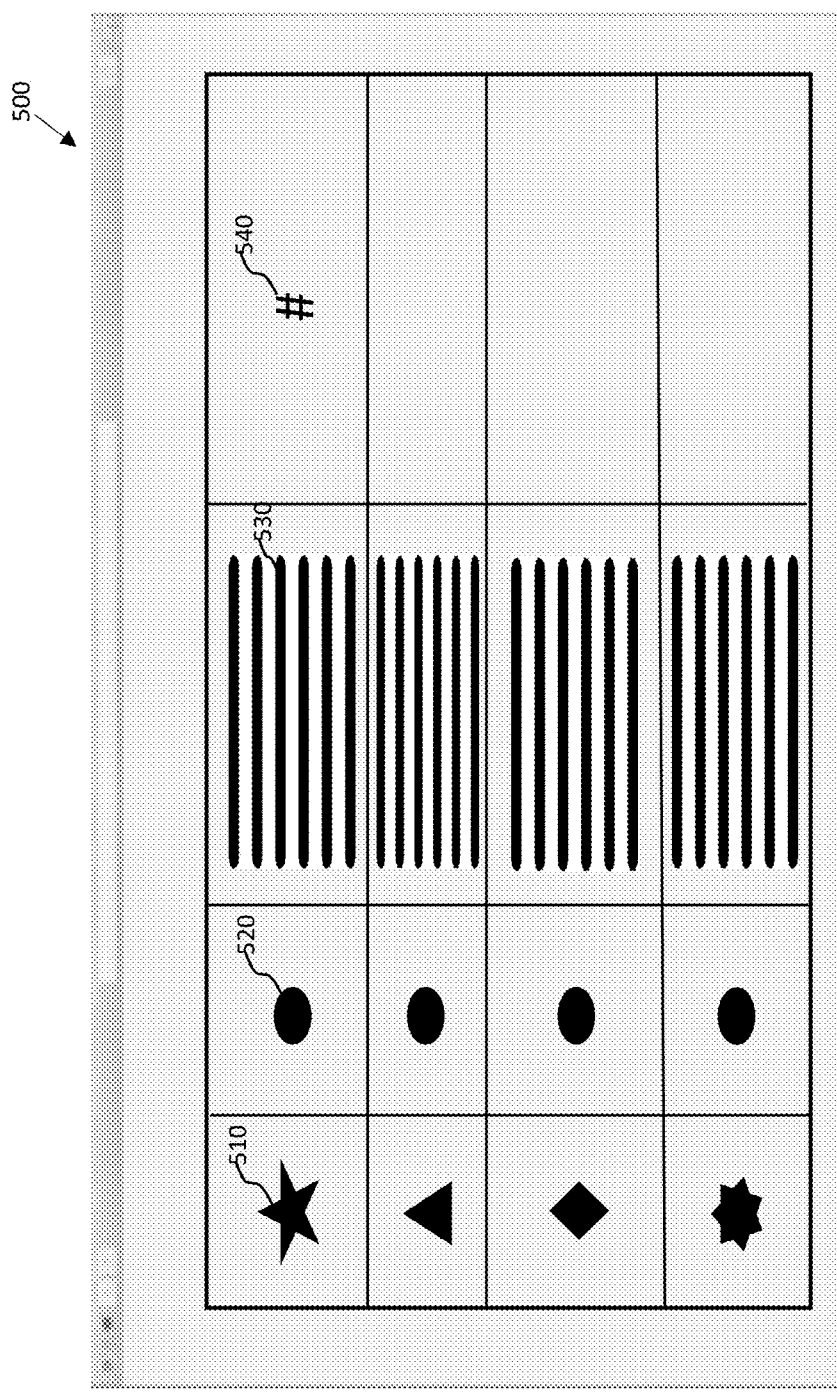
FIG. 5 illustrates an exemplary user interface of implementations of embodiments of the invention according to at least one embodiment.

Referring now to FIG. 5, depicts a user interface 500 including a correlation statement of event grouping environment 100 in accordance with an exemplary embodiment. In some embodiments, correlation statement 500 includes a plurality of columns configured to reflect indications of events grouped based on history occurrences of similar components of summaries 135 that were found via the steps of process 400. In particular, the correlation statement may include a priority indicator 510 reflecting the importance of the computing system fault events, an applicable node designator 520, a plurality of summaries 530 derived from computing system fault events 130, and a plurality of correlations and/or correlation values 540 reflecting the correlations associated with event clusters 160 and/or groups 170. In some embodiments, correlations 540 may be represented by a value, a grade/ranking, or any other applicable form of representing correlations known those of ordinary skill in the art. It should be noted that the purpose of correlation statement 500 is to indicate one or more correlations between the computing system fault events processed by modeling module 220 and the new computing system fault of computing event management system 210.

Figure 6:
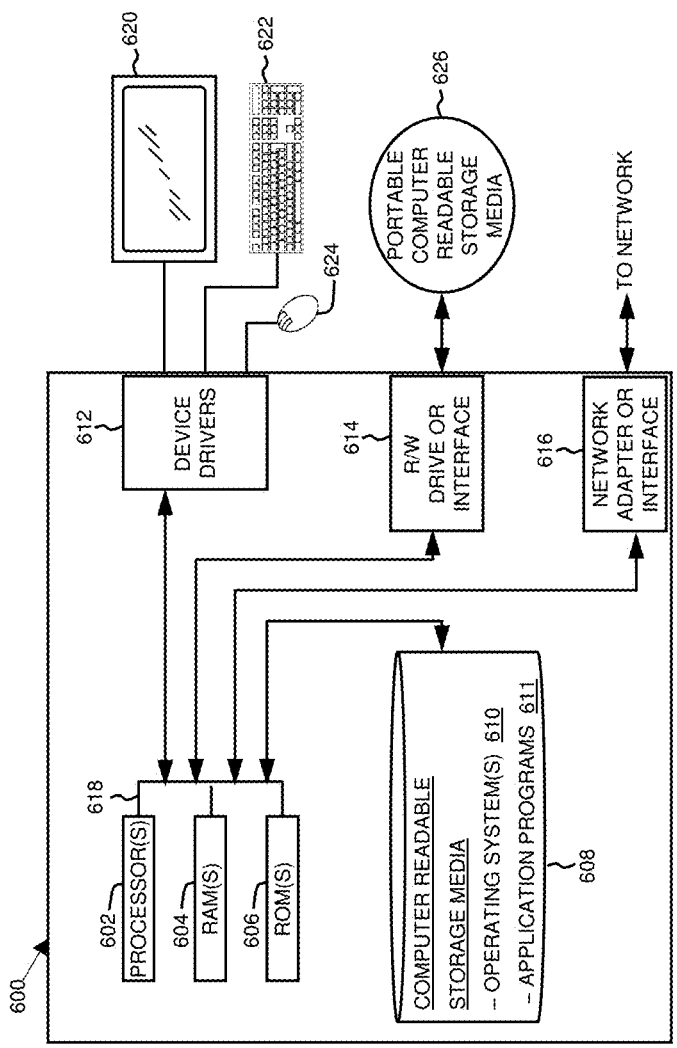
FIG. 6 depicts a block diagram illustrating components of the software application of FIG. 1, in accordance with an embodiment of the invention.

FIG. 6 is a block diagram of components 600 of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 602, 604 is representative of any electronic device capable of executing machine-readable program instructions. Data processing system 602, 604 may be representative of a smart phone, a computer system, PDA, or other electronic devices. Examples of computing systems, environments, and/or configurations that may be represented by data processing system 602, 604 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The one or more servers may include respective sets of components illustrated in FIG. 6. Each of the sets of components include one or more processors 602, one or more computer-readable RAMs 608 and one or more computer-readable ROMs 610 on one or more buses 602, and one or more operating systems 614 and one or more computer-readable tangible storage devices 616. The one or more operating systems 614 and computing event management system 210 may be stored on one or more computer-readable tangible storage devices 616 for execution by one or more processors 602 via one or more RAMs 608 (which typically include cache memory). In the embodiment illustrated in FIG. 6, each of the computer-readable tangible storage devices 616 is a magnetic disk storage device of an internal hard drive. Alternatively, each of the computer-readable tangible storage devices 616 is a semiconductor storage device such as ROM 610, EPROM, flash memory or any other computer-readable tangible storage device that can store a computer program and digital information.

Each set of components 600 also includes a R/W drive or interface 614 to read from and write to one or more portable computer-readable tangible storage devices 608 such as a CD-ROM, DVD, memory stick, magnetic tape, magnetic disk, optical disk or semiconductor storage device. A software program, such as computing event management system 210 can be stored on one or more of the respective portable computer-readable tangible storage devices 608, read via the respective RAY drive or interface 618 and loaded into the respective hard drive.

Each set of components 600 may also include network adapters (or switch port cards) or interfaces 616 such as a TCP/IP adapter cards, wireless wi-fi interface cards, or 3G or 4G wireless interface cards or other wired or wireless communication links. COP 120 can be downloaded from an external computer (e.g., server) via a network (for example, the Internet, a local area network or other, wide area network) and respective network adapters or interfaces 616. From the network adapters (or switch port adaptors) or interfaces 616, computing event management system 210 is loaded into the respective hard drive 608. The network may comprise copper wires, optical fibers, wireless transmission, routers, firewalls, switches, gateway computers and/or edge servers.

Each of components 600 can include a computer display monitor 620, a keyboard 622, and a computer mouse 624. Components 600 can also include touch screens, virtual keyboards, touch pads, pointing devices, and other human interface devices. Each of the sets of components 600 also includes device processors 602 to interface to computer display monitor 620, keyboard 622 and computer mouse 624. The device drivers 612, R/W drive or interface 618 and network adapter or interface 618 comprise hardware and software (stored in storage device 604 and/or ROM 606).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
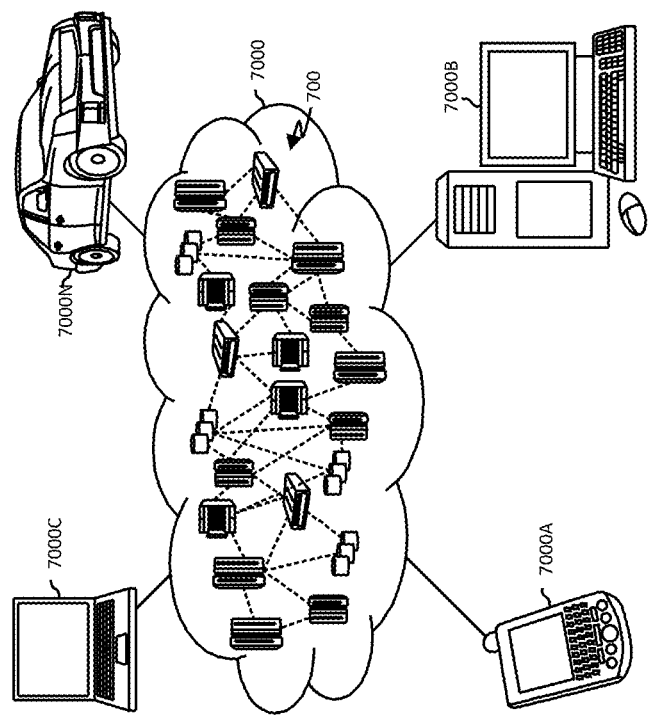
FIG. 7 depicts a cloud-computing environment, in accordance with an embodiment of the present invention.

Referring now to FIG. 7, illustrative cloud computing environment 700 is depicted. As shown, cloud computing environment 700 comprises one or more cloud computing nodes 7000 with which local computing devices used by cloud consumers, such as, for example, personal digital assistant (PDA) or cellular telephone 7000A, desktop computer 7000B, laptop computer 7000C, and/or automobile computer system 7000N may communicate. Nodes 7000 may communicate with one another. They may be grouped (not shown) physically or virtually, in one or more networks, such as Private, Community, Public, or Hybrid clouds as described hereinabove, or a combination thereof. This allows cloud computing environment 7000 to offer infrastructure, platforms and/or software as services for which a cloud consumer does not need to maintain resources on a local computing device. It is understood that the types of computing devices 7000A-N shown in FIG. 7 are intended to be illustrative only and that computing nodes 7000 and cloud computing environment 700 can communicate with any type of computerized device over any type of network and/or network addressable connection (e.g., using a web browser).

Figure 8:
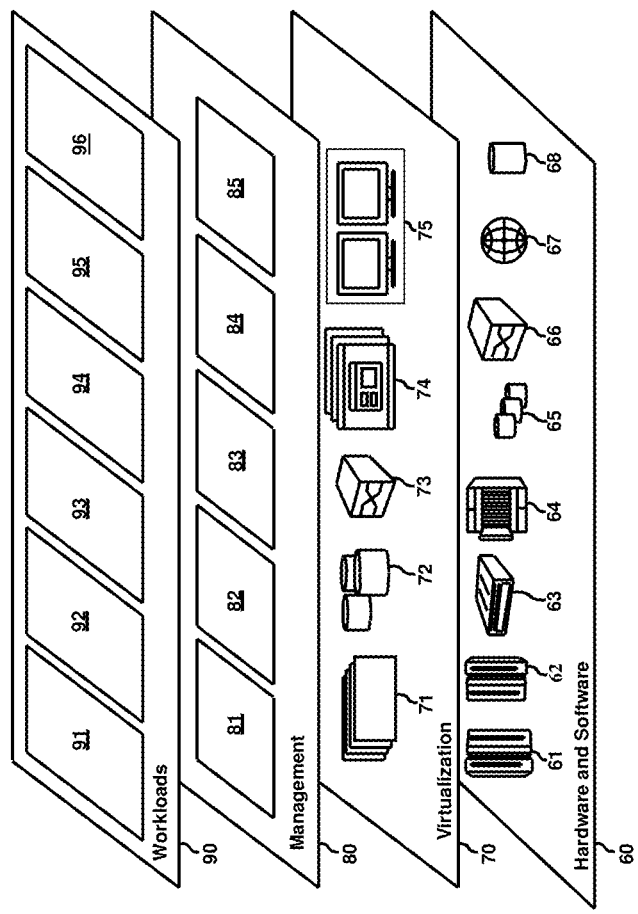
FIG. 8 depicts abstraction model layers, in accordance with an embodiment of the present invention.

Referring now to FIG. 8 a set of functional abstraction layers provided by cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95.

Based on the foregoing, a method, system, and computer program product have been disclosed. However, numerous modifications and substitutions can be made without deviating from the scope of the present invention. Therefore, the present invention has been disclosed by way of example and not limitation.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that, although specific embodiments have been described herein for purposes of illustration, various modifications may be made without departing from the spirit and scope of the embodiments. In particular, transfer learning operations may be carried out by different computing platforms or across multiple devices. Furthermore, the data storage and/or corpus may be localized, remote, or spread across multiple systems. Accordingly, the scope of protection of the embodiments is limited only by the following claims and their equivalent.

What is claimed is:

1. A computer-implemented method for grouping a plurality of computing system fault events and generating automatically a system fault solution, the method comprising:

accessing, via a computing device, information regarding a new computing system fault associated with a monitored computer system;

receiving, via the computing device, a plurality of historical computing system fault data associated with a plurality of computing system fault events;

extracting, via the computing device, a summary of each previous computing system fault event derived from the plurality of historical computing system fault event data based on at least one similarity detected;

generating, via the computing device, a plurality of vectors utilizing an encoder in which each vector corresponds to a summary of each computing system fault event;

clustering, via the computing device, the plurality of vectors into a plurality of clusters based on the at least one similarity;

compressing, via the computing device, each cluster of the plurality of clusters into at least one cluster centroid;

generating, via the computing device, a group centroid for a group including the plurality of clusters based on the at least one cluster centroid;

presenting, via the computing device, a correlation statement derived from a result associated with the group centroid, the correlation statement indicating one or more correlations between the computing system fault events and the new computing system fault; and generating, via the computing device, a system fault solution for the new computing system fault based on the correlation statement.

2. The computer-implemented method of claim 1, wherein the at least one similarity is determined via the computer based on a calculated distance between at least two vectors of the plurality of vectors.

3. The computer-implemented method of claim 1, wherein the at least one similarity includes a common issue or solution associated with at least two vectors of the plurality of vectors corresponding to the summary.

4. The computer-implemented method of claim 1, wherein generating a plurality of vectors comprises:
applying, via the computer, the summary of each event to at least one word embedding model configured to generate a plurality of word vectors;
wherein each word vector of the plurality of word vectors correspond to at least one event of the plurality of system fault events.

5. The computer-implemented method of claim 4, wherein compressing each cluster into at least one cluster centroid comprises:
removing, via the computer, one or more duplicates of the plurality of word vectors based on the summary; and
generating, via the computer, the at least one cluster centroid based on a cluster result of the removal, wherein the at least one cluster centroid is a representation of the applicable cluster of the plurality of clusters grouped based on the at least one similarity.

6. The computer-implemented method of claim 5, wherein removing the one or more duplicates of the plurality of word vectors comprises:
removing the one or more duplicates within the plurality of clusters based on a calculated event similarity metric exceeding a threshold distance from the at least one cluster centroid.

7. The computer-implemented method of claim 5, wherein generating the group centroid further comprises:
determining, via the at least one word embedding model, the group centroid based on a cluster average of a cluster of the plurality of clusters, wherein the cluster centroid is a cluster vector;
updating, via the at least one word embedding model, the group centroid based on the removal of the one or more duplicates;
wherein the cluster vector corresponds to a subset of the plurality of system fault events including the at least one similarity.

8. The computer-implemented method of claim 1, wherein the calculated distance between at least two vectors of the plurality of vectors is calculated using Euclidean distance.

9. A computer system for grouping a plurality of system fault events, the computer system comprising: one or more processors; one or more non-transitory computer-readable tangible storage devices; and program instructions stored on at least one of the one or more non-transitory computer-readable tangible storage devices for execution by at least one of the one or more processors, the program instructions comprising:
program instructions to access information regarding a new computing system fault associated with a monitored computer system;
program instructions to receive a plurality of historical system fault data associated with a plurality of system fault events;
program instructions to extract a summary of each previous system fault event derived from the plurality of historical system fault event data based on at least one similarity detected;
program instructions to generate a plurality of vectors utilizing an encoder in which each vector corresponds to a summary;
program instructions to cluster the plurality of vectors into a plurality of clusters based on the at least one similarity;
program instructions to compress each cluster of the plurality of clusters into at least one cluster centroid;
program instructions to generate a group centroid for a group including the plurality of clusters based on the at least one cluster centroid;
program instructions to present a correlation statement derived from a result associated with the group centroid, the correlation statement indicating one or more correlations between the computing system fault events and the new computing system fault; and
program instructions to generate a system fault solution for the new computing system fault based on the correlation statement.

10. The computer system of claim 9, wherein the at least one similarity is determined based on a calculated distance between at least two vectors of the plurality of vectors.

11. The computer system of claim 9, wherein the at least one similarity includes a common issue or solution associated with at least two vectors of the plurality of vectors corresponding to the summary.

12. The computer system of claim 9, wherein the program instructions to generate a plurality of vectors further comprises program instructions to:
apply the summary of each event to at least one word embedding model configured to generate a plurality of word vectors;
wherein each word vector of the plurality of word vectors correspond to at least one event of the plurality of system fault events.

13. The computer system of claim 12, wherein the program instructions to compress each cluster into at least one cluster centroid comprises program instructions to:
remove one or more duplicates of the plurality of word vectors based on the summary; and
generate the at least one cluster centroid based on a cluster result of the removal, wherein the at least one cluster centroid is a representation of the applicable cluster of the plurality of clusters grouped based on the at least one similarity.

14. The computer system of claim 13, wherein the program instructions to remove the one or more duplicates of the plurality of word vectors comprises program instructions to:
remove the one or more duplicates within the plurality of clusters based on a calculated event similarity metric exceeding a threshold distance from the at least one cluster centroid.

15. The computer system of claim 13, wherein the program instructions to generate the group centroid further comprises program instructions to:
determine, via the at least one word embedding model, the group centroid based on a cluster average of a cluster of the plurality of clusters, wherein the cluster centroid is a cluster vector;
update, via the at least one word embedding model, the group centroid based on the removal of the one or more duplicates;

wherein the cluster vector corresponds to a subset of the plurality of system fault events including the at least one similarity.

16. The computer system of claim 13, wherein the calculated distance between at least two vectors of the plurality of vectors is calculated using Euclidean distance.

17. A computer program product for grouping a plurality of system fault events, the computer program product comprising program instructions collectively stored on one or more non-transitory computer-readable tangible storage devices, the stored program instructions comprising:
   receiving, via the computer device, a plurality of historical system fault data associated with a plurality of system fault events;
   extracting, via the computing device, a summary of each previous system fault event derived from the plurality of historical system fault event data based on at least one similarity detected;
   generating, via the computing device, a plurality of vectors utilizing an encoder in which each vector corresponds to a summary;
   clustering, via the computing device, the plurality of vectors into a plurality of clusters based on the at least one similarity;
   compressing, via the computing device, each cluster of the plurality of clusters into at least one cluster centroid;
   generating, via the computing device, a group centroid for a group including the plurality of clusters based on the at least one cluster centroid;
   presenting, via the computing device, a correlation statement derived from a result associated with the group centroid, the correlation statement indicating one or more correlations between the computing system fault events and the new computing system fault; and
   generating, via the computing device, a system fault solution for the new computing system fault based on the correlation statement.

18. The computer program product of claim 17, wherein generating a plurality of vectors by the computing device comprises:
   applying, via the computing device, the summary of each event to at least one word embedding model configured to generate a plurality of word vectors;
   wherein each word vector of the plurality of word vectors correspond to at least one event of the plurality of system fault events.

19. The computer program product of claim 17, wherein compressing each cluster into at least one cluster centroid by the computing device comprises:
   removing, via the computing device, one or more duplicates of the plurality of word vectors based on the summary; and
   generating, via the computing device, the at least one cluster centroid based on a cluster result of the removal, wherein the at least one cluster centroid is a representation of the applicable cluster of the plurality of clusters grouped based on the at least one similarity.

20. The computer program product of claim 18, wherein generating the group centroid by the computing device further comprises:
   removing, via the computing device, one or more duplicates of the plurality of word vectors based on the summary; and
   generating, via the computing device, the at least one cluster centroid based on a cluster result of the removal, wherein the at least one cluster centroid is a representation of the applicable cluster of the plurality of clusters grouped based on the at least one similarity.

* * * * *